United States Patent [19]

Mabrey et al.

[11] Patent Number: 4,623,696

[45] Date of Patent: Nov. 18, 1986

[54] DICYCLOPENTADIENE-TRIS(2-HYDROXYETHYL)ISOCYANURATE-MODIFIED POLYESTERS

[75] Inventors: David W. Mabrey, Belleair, Fla.; James M. Dye, St. Charles, Mo.

[73] Assignee: The P. D. George Company, St. Louis, Mo.

[21] Appl. No.: 729,653

[22] Filed: May 2, 1985

[51] Int. Cl.$^4$ .............................................. C08G 63/46
[52] U.S. Cl. ........................................ 525/33; 525/34; 525/445; 525/451; 528/291; 528/296; 528/298
[58] Field of Search ................... 525/33, 34, 445, 451; 528/291, 296, 298

[56] References Cited

U.S. PATENT DOCUMENTS 3,322,732 5/1967 Tsuruta et al. ..................... 260/78.5
4,443,580 4/1984 Hefner ................................. 525/44

OTHER PUBLICATIONS

Nelson, "Considerations: Dicyclopentadiene in Polyester Resins", 36th Annual Conference, Reinforced Plastics/Composites Institute, The Society of the Plastics Industry Inc., Feb. 16–20, 1981.

Primary Examiner—Maurice J. Welsh
Attorney, Agent, or Firm—Sidney B. Ring; Leon Zitver

[57] ABSTRACT

This invention relates to:
(1) Unsaturated polyesters modified with dicyclopentadienes (DCPD) and tris(2-hydroxyethyl)isocyanurate (THEIC)
(2) Blends of such polyesters with polymerizable ethylenically unsaturated monomers
(3) The cured products of (1) and (2), and
(4) The use of such products in a wide variety of applications including electrical applications, sheets and films thereof, both non-reinforced and reinforced, "B" stage resins, etc.

These compositions possess excellent properties and bond strengths at high temperatures.

14 Claims, No Drawings

DICYCLOPENTADIENE-TRIS(2-HYDROXYE-THYL)ISOCYANURATE-MODIFIED POLYESTERS

Unsaturated polyesters are useful in the fabrication of a wide variety of products. They are made by reacting dibasic acids, such as phthalic anhydride, maleic anhydride, etc., with difunctional alcohols, such as ethylene glycol, propylene glycol, etc. The physical and chemical properties can be changed through choice of reactants, polymerization procedures and other means.

Heretofore, dicyclopentadiene (DCPD) has been employed with unsaturated polyester resins. Examples of DCPD polymers can be found in U.S. Pat. No. 3,322,732, May 30, 1967 and U.S. Pat. No. 4,443,580, Apr. 17, 1984.

We have now prepared unsaturated polyester resins modified with both DCPD and Tris(2-hydroxyethyl)isocyanurate (THEIC).

This invention relates to
(1) unsaturated polyesters modified with dicyclopentadiene (DCPD) and Tris(2-hydroxyethyl)isocyanurate (THEIC);
(2) blends of such Polyesters with copolymerizable ethylenically unsaturated monomers;
(3) the cured products of (1) and (2); and
(4) The use of such products in a wide variety of applications, incuding electrical applications, "B" stage resins, sheets and films, both reinforced and non-reinforced, etc.

These compositions have excellent properties and high bond strength at high temperatures. They possess these properties without requiring conventional solvents so that, being 100% reactive, they give off little, if any, by-products to the environment during application.

These DCPD-THEIC resins have superior properties particularly at high temperatures. For example, they possess superior properties and bond strength at high temperatures for long periods of time. In addition, since that can be formulated with little, if any, solvents they give off less volatiles and have less stack loss so that they better conform to EPA standards than products currently marketed.

DCPD is sold commercially as a product of about 97 or greater percent purity. It is also sold as a $C_{10}$ hydrocarbon concentrate prepared by dimerizing a crude $C_5$ stream from the cracking of hydrocarbons such as disclosed in U.S. Pat. No. 3,556,239.

These concentrates have as the main reactive components about 70 to about 90 percent by weight of DCPD, about 5 to about 30 percent by weight of the mixed Diels-Alder dimers of diolefins such as butadiene, cis- and trans-piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified in these concentrates are the Diels-Alder adducts of two moles of isoprene (isoprene dimers), the adduct of cyclopentadiene and piperylene ($CH_3-CH=CH-CH=CH_2$), and the like.

Either DCPD or DCPD concentrate can be used in this invention, however the high purity tends to have improved properties in the resin systems.

An unsaturated polyester is a condensation polymer produced by condensing approximately equimolar portions of at least one polycarboxylic acid and/or anhydride, at least a portion of which contains ethylenic unsaturation, with at least one polyol.

Examples of such unsaturated acids include maleic, fumaric, itaconic and others. The remainder, if any, of the polycarboxylic acids are usually either saturated normal aliphatics, such as adipic acid, succinic acid, cycloaliphatic such as tetrahydrophthalic acid, endomethylene tetrahydrophthalic acid, etc., or aromatic diacids, such phthalic acid, isophthalic acid, terephthalic acid, a preferred aromatic tricarboxylic acid is trimellitic acid and/or the anhydride, or the like. The term "polycarboxylic acid", as used herein, is intended to embrace the anhydride as well.

The unsaturated acid and/or anhydride provides the unsaturation needed for curing the resin. Therefore, the actual ratio of unsaturated acid to saturated acid depends on the degree of crosslinking desired in the cured product. That degree of crosslinking may be predetermined by simple preliminary experiments as is standard in the polyester art.

The polyols used to prepare the polyesters of this invention are those which are reactive with acids and/or anhydrides and may include, for example, ethylene glycol, propylene glycol, diethylene glycol, dipropylene glycol, butanediol, hexanediol, dicyclopentadiene dimethanol, neopentylglycol, 2,2,4, trimethyl 1,3, pentanediol (TMPD), pentaerythritol, triethylene glycol, trimethylol propane, glycerol, or mixtures thereof. Preferably, the glycols used in this invention are propylene glycol and/or dipropylene glycol and/or diethylene glycol and the higher boiling glycols as the major glycol components.

The degree of reaction is conveniently determined using known methods by measuring the amount of water liberated in the reaction.

The resin is then blended with polymerizable ethylenically unsaturated monomers such as monovinyl, divinyl or polyvinyl aromatic monomers or mixture of vinyl aromatic monomers. Such monovinyl aromatic monomers are well known and include: styrene, methylstyrene, chlorostyrenes, vinyltoluenes, isopropenyl phenol and the like. Divinyl and polyvinyl aromatic monomers include divinylbenzene, divinyltoluene, trivinyl benzene and the like.

Examples of other polymerizable monomers include aliphatic monomers, for example, acrylates and methacrylates such as esters of methacrylic acid, for example methylmethacrylate, etc.; allyl monomers such as allyl esters, for example diallyl phthalate triallyl cyanurate, etc. Mixtures of the above monomers with other monomers can also be employed.

These polyester blends with unsaturated monomers contain about 20 to about 60 percent by weight and preferably about 30 to about 50 percent by weight of the ethylenically unsaturated monomers based on the weight of the polyester. A small amount of an inhibitor such as hydroquinone or the like may be added to this mixture.

The polyesters can be prepared by a variety of procedures. Preferably they are prepared by the hydrolysis method wherein the unsaturated polycarboxylic anhydride and/or acid is hydrolyzed with water and reacted with less than or equal to the stoichiometric equivalent of the dicyclopentadiene derivative to form esterified derivative containing unesterified acid and/or anhydride. This reaction may conveniently be performed in stages whereby reactants are added dropwise, thus controlling exotherms. Reactants can also be added continuously.

To the mixture of esterified DCPD and unesterified acid and/or anhydride is added the polyol and other desired reactants. That addition can be a bulk addition wherein all of the polyol and other reactants are added in one step. Alternatively, the addition can be an incremental addition wherein all of the polyol and a fractional equivalent of the other reactants are added initially and allowed to react after which subsequent increments of other reactants are added. In all instances, water is continuously removed during the esterification step. The timing of the remaining additions can be easily determined by the amount of water removed, by acid number and/or by viscosity.

The resin is recovered and blended with the ethylenically unsaturated monomer mixture as described herein.

The blend can be cured by well-known and traditional methods.

The polyesters are curable by known catalyst systems. Peroxides, such as methyl ethyl ketone, dibutyl, cyclohexanone, and dicumyl, etc. peroxides can be used with or without known promoters, such as cobalt octoate or cobalt naphthenate, that function with such peroxides. Acyl peroxides, such as benzoyl peroxides, tert-butyl perbenzoate, can be used with or without promoters such as tertiary amines, including typically dimethyl aniline, N,N-dimethyl-p-toluidine, dimethylacetylacetamide, etc. The concentrations of catalyst and promoter are adjusted with known limits of from about 0.1 to 3.0 weight percent depending on the rate of cured desired, the magnitude of the generated exotherm and for other known purposes. Known polymerization inhibitor or gelation retarding agents, such as hydroquinones, methylether hydroquinones (MEHQ), monotertiary butyl hydroquinone, p-benzoquinone, etc. can be employed in the curing system.

The hydrolysis of the unsaturated anhydride (e.g., maleic anhydride) and the reaction of the hydrolysis product with dicyclopentadiene proceeds as follows:

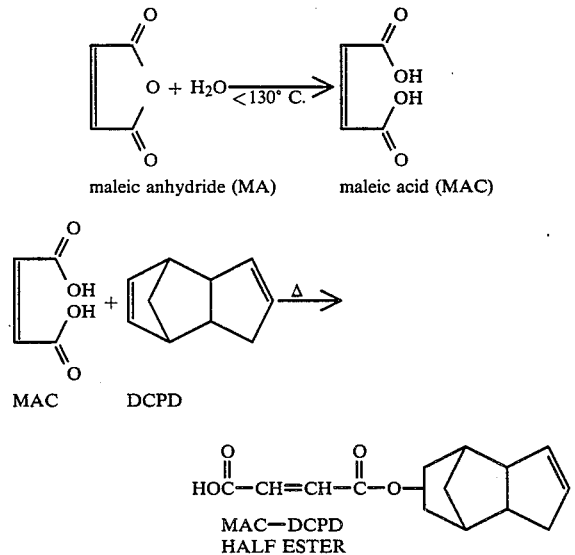

The hydrolysis of MA yields MAC (maleic acid) which has sufficient acid strength to react with DCPD to yield dicyclopentadiene-maleic half ester provided the temperature of reaction does not exceed 130° C. (266° F.) since above 130° C. DCPD cracks yielding cyclopentadiene which reacts with MA to yield a Diels-Alder adduct according to the following equation:

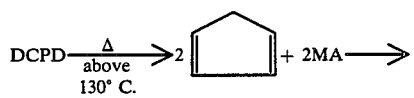

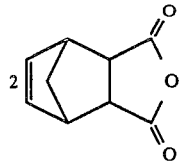

A good discussion of these reactions and resins containing same is found in "Considerations: Dicyclopentadiene in Polyester Resins", 36th Annual Conference, Reinforced Plastics/Composites Institute. The Society of Plastics Industry, Inc. Feb. 16-20, 1981.

The following is a general procedure for preparing compositions of this invention, using maleic anhydride as a starting unsaturated polycarboxylic acid anhydride as illustrative.

PART I

MA, with or without other polycarboxylic acids or anhydrides, is hydrolysed.

PART II

DCPD with or without polyols, is added to PART I below about 130° C. (266° F.).

PART III

THEIC, modified THEIC (such as with a mono-carboxylic acid in situ), and other polyester components such as polycarboxylic acids and polyols are added and reacted to the desired viscosity.

PART IV

A vinyl polymerization inhibitor or gelation retarder, such as hydroquinone, etc. is added to prevent polymerization until desired.

PART V

A polymerizable ethylenically unsaturated monomer, either aromatic, aliphatic, or both, is added.

This formulation is used in the desired application.

The components of the compositions prepared as above described comprise:

| % By weight of composition | Broad Range | Intermediate Range | Optimum Range |
|---|---|---|---|
| DCPD | at least 20% of the polyester | 24-38% | 28-33% |
| THEIC | at least 1.5% of the polyester | 3-30% | 10-18% |
| Ethylenically unsaturated monomer in the blend with polyester | at least 20% of the blend | 25-60% | 30-50% |

The polyester itself, without ethylenically unsaturated monomers, can also be used to prepare films, sheets, both reinforced or non-reinforced such as in "B" Stage resins. The films or sheets can be cast from solvent systems and molded into shapes reinforced with fibers such as fiberglass, etc.

Preferably, the number average molecular weight (NO AVMW) of this polyester, is at least about 1000.

The following examples are given to illustrate the invention and not to limit the scope of the invention. All parts and percentages are by weight unless otherwise specified. In all the Examples Xylol is used as the reflux solvent.

TABLE I

The abbreviations used refer to the following ingredients:

| ABBREVIATION | INGREDIENT |
| --- | --- |
| TBHQ | Tert-butylhydroquinone |
| MA | Maleic Anhydride |
| TMA | Trimellitic Anhydride |
| $H_2O$ | Water |
| DCPD | Dicyclopentadiene |
| THEIC | Tris(2-Hydroxyethyl)isocyanurate |
| EG | Ethylene Glycol |
| DEG | Diethylene Glycol |
| PG | Propylene Glycol |
| 1,6HD | 1,6-Hexanediol |
| NPG | Neopentyl Glycol |
| BTDA | Benzophenone Tetracarboxylic Dianhydride |
| PMS | Para Methyl Styrene |
| HQ | Hydroquinone |
| AA | Adipic Acid |
| S | Styrene |
| VT | Vinyl Toluene |
| IPA | Isophthalic Acid |

PRIOR ART UNSATURATED POLYESTER

The following is an example of prior art unsaturated polyesters, composition and the properties exhibited with such composition. It contains DCPD but no THEIC.

EXAMPLE 1

| MATERIAL | WEIGHT | MOLES | EQUIVA-LENTS | % EQUIVA-LENTS |
| --- | --- | --- | --- | --- |
| | | Part I | | |
| IPA | 226 | 1.36 | 2.72 | 25.07 |
| EG | 41 | 1.66 | 1.32 | 12.17 |
| DEG | 214 | 2.02 | 4.04 | 37.24 |
| | | Part II | | |
| (A) MA | 118 | 1.20 | 2.41 | 22.20 |
| (B) DCPD | 47 | .36 | .36 | 3.32 |
| | | Part III | | |
| TBHQ | .0069 | | | |
| HQ | .0346 | | | |
| | | Part IV | | |
| VT | 309.4 | | | |

In a reactor equipped with an agitator and a packed column, $CO_2$ blow, load Part I, heat 400°–410° F. for 4–5 hours, hold for acid value of 40–65, heat off, cool to 200°–250° F.; add Part A of II, heat to 320° F. then add Part B of II, hold at 310°–320° F. during addition, reheat to 400°–415° F. and final acid value (AV) of 40. When desired constants are obtained, heat off, blow off Xylol, switch to scrubber, cool to 260° F., add Part III, switch to total reflux, mix Part III for 15 minutes, then add Part IV, cool below 100° F.

| PROPERTIES OF PRODUCT (EX. 1) | |
| --- | --- |
| Weight per Gallon | 9.53 |
| Specific Gravity @ 25° C. | 1.1465 |
| Monomer Content | 35% |

| PROPERTIES OF PRODUCT (EX. 1) | |
| --- | --- |
| Viscosity - Brookfield | 1055 CP |
| Acid Value (AV) | 33 |
| Flash Point PMCC | 114° F. |
| SPI* - Peak Exotherm | 94° C. |
| Gel | 14.8 |
| Cure | 20.8 |

*Society of Plastics Industry

Molecular weight by GPC (gel permeation chromotography) was on PL Gel Columns at 100° C. in DMAC. (Dimethylacetamide)

| | (1) | (2) |
| --- | --- | --- |
| NO. AV MW | 1925 | 2005 |
| WT. AV MW | 10169 | 9763 |
| Z AV MW | 31283 | 26410 |
| DISPERSITY | 5.284 | 4.869 |

The following is an example of a composition of this invention with both DCPD and THEIC:

EXAMPLE 2

| MATERIAL | WEIGHT | MOLES | EQUIVA-LENTS | % EQUIVA-LENTS |
| --- | --- | --- | --- | --- |
| | | PART I | | |
| MA | 1761 | 17.97 | 35.94 | 27.75 |
| TMA | 744 | 3.88 | 11.63 | 8.98 |
| $H_2O$ | 390 | 21.67 | 21.67 | 16.73 |
| | | PART II | | |
| DCPD | 2450 | 18.56 | 18.56 | 14.33 |
| | | PART III-A | | |
| Benzoic Acid | 611 | 5.01 | 5.01 | 3.87 |
| THEIC | 1308 | 5.01 | 15.03 | 11.60 |
| 1,6HD | 1279 | 10.84 | 21.68 | 16.74 |
| | | PART III-B | | |
| HQ | 1.7 | | | |
| | | PART IV | | |
| PMS | 35.77 | | | |

In a reactor set for total reflux, load Part I, heat to 200° F. After exotherm put coolers on and start adding Part II; when all of Part II is added, heat to 260° F. and hold for one-half hour. Change to packed column and add Part III-A. Heat to 325±15° F. and hold for AV 30 or less. Heat to 415° F.; hold for AV 15–20 and Viscosity C-E; when obtained, blow off reflux solvent, apply 24 inch vacuum, cool to 250° F; remove vacuum; add Part III-B, mix 15–20 minutes, then add Part IV, cool to below 100° F.

| PROPERTIES OF PRODUCT (EX. 2) | |
| --- | --- |
| Weight per Gallon | 9.11 |
| Viscosity - Brookfield | 1140 CP |
| Sunshine Gel Time | 23.7 |
| Acid Value | 24.4 |
| Monomer (ASTM D3312-74) | 32% |
| Flash Point - PMCC | 116° C. |
| Peak Exotherm SPI | 148° C. |
| Gel | 8.8 |
| Cure | 11.5 |

Ex. 3 is an example designed to reduce the weight loss on heat aging compared to Example 2.

EXAMPLE 3

| MATERIAL | WEIGHT | MOLES | EQUIVA-LENTS | % EQUIVA-LENTS |
|---|---|---|---|---|
| | PART I | | | |
| MA | 217 | 2.21 | 4.43 | 28.65 |
| TMA | 92 | .48 | 1.44 | 9.31 |
| H₂O | 48 | 2.67 | 2.67 | 17.27 |
| | PART II | | | |
| DCPD | 302 | 2.29 | 2.29 | 14.81 |
| | PART III | | | |
| AA | 32 | .22 | .44 | 2.85 |
| THEIC | 48 | .18 | .55 | 3.56 |
| NPG | 24 | .23 | .45 | 2.91 |
| 1,6HD | 188 | 1.59 | 3.19 | 20.64 |
| | PART IV | | | |
| HQ | .067 | | | |
| | PART V | | | |
| PMS | 35% | | | |

The resin was processed as in Example 2.

| PROPERTIES OF PRODUCT (EX. 3) | |
|---|---|
| Weight per Gallon | 9.11 |
| Viscosity - Brookfield | 850 CP |
| Sunshine Gel Time | 23.7 |
| Acid Value | 20.4 |
| Monomer (ASTM D3312-74) | 31% |
| Peak Exotherm SPI | 110° C. |
| Flash Point - PMCC | 166° F. |

This example 4 has an increased amount of THEIC and TMA.

EXAMPLE 4

| MATERIAL | WEIGHT | MOLES | EQUIVA-LENTS | % EQUIVA-LENTS |
|---|---|---|---|---|
| | PART I | | | |
| MA | 1864 | 19.02 | 38.04 | 27.88 |
| TMA | 913 | 4.76 | 14.27 | 10.46 |
| H₂O | 428 | 23.78 | 23.78 | 17.43 |
| | PART II | | | |
| DCPD | 2667 | 20.21 | 20.21 | 14.81 |
| | PART III | | | |
| THEIC | 2442 | 9.36 | 28.07 | 20.57 |
| PG | 459 | 6.00 | 12.08 | 8.85 |
| | PART IV | | | |
| HQ | 1.7 | | | |
| | PART V | | | |
| PMS | 5221 | | | |

The ingredients are charged into a reactor equipped with a motor driven agitator, carbon dioxide sparge tube and a condenser or packed column as indicated. Reactor is set for total reflux. Load Part I, heat to 200° F. after exotherm, put on coolers and start adding Part II. When all of Part II is added, heat to 260° F. and hold for one-half hour. Change to packed column and add Part III. Heat to 325±15° F. and hold for AV 30 or less. Heat to 415° F., hold for AV 15-20 and C-E viscosity. When obtained, blow off reflux solvent, apply 24 inch vacuum, cool to 250° F., remove vacuum, add Part IV, mix 15-20 minutes; after cooling add Part V, cool to below 100° F.

| PROPERTIES OF PRODUCT (EX. 4) | |
|---|---|
| Weight per Gallon | 9.25 |
| Viscosity - Brookfield | 59,500 CP |
| Monomer (ASTM D3312-74) | 41.5 |
| Acid Value | 25.1 |

Molecular weight was run using the GPC on PL gel columns @ 100° C. in DMAC @ 288 wave length.

| | (1) | (2) |
|---|---|---|
| NO AV MW | 1124 | 1114 |
| WT AV MW | 68328 | 71066 |
| Z AV MW | 389614 | 399271 |
| Dispersity | 60.784 | 63.773 |
| Max. Slice MW | 1033 | 1204 |

The following example is similar to Example 4 except without TMA.

EXAMPLE 5

| MATERIAL | WEIGHT | MOLES | EQUIVA-LENTS | % EQUIVA-LENTS |
|---|---|---|---|---|
| | PART I | | | |
| MA | 2466 | 25.16 | 50.33 | 35.07 |
| H₂O | 486 | 27.00 | 27.00 | 18.82 |
| | PART II | | | |
| DCPD | 2671 | 20.24 | 20.24 | 14.10 |
| | PART III | | | |
| AA | 230 | 1.58 | 3.15 | 2.20 |
| THEIC | 1473 | 5.64 | 16.93 | 11.80 |
| NPG | 214 | 2.06 | 4.12 | 2.87 |
| 1,6HD | 1282 | 10.86 | 21.73 | 15.14 |
| | PART IV | | | |
| HQ | 1.7 | | | |
| | PART V | | | |
| PMS | 3354 | | | |

The ingredients are charged into a reactor equipped with a motor driven agitator, carbon dioxide sparge tube and a condenser or packed column, heated by electric jacket with temperature controller.

Reactor is set for total reflux, load Part I, heat to 200° F. after exotherm, start adding Part II, keep temperature below 260° F. When all of Part II is added, heat to 260° F. and hold for one-half hour. Change to packed column and add Part III. Heat to 325±15° F. and hold for an AV of 30 or less. Heat to 415° F. and hold for an anticipated AV of 15-20 and a viscosity of C-E. When obtained, blow off reflux solvent, apply 24 inches vacuum, cool to 250° F., remove vacuum, add Part IV, mix 15-20 minutes, add Part V, cool to below 100° F.

| PROPERTIES OF PRODUCT (EX. 5) | |
|---|---|
| Weight per Gallon | 9.23 |
| Viscosity - Brookfield | 990 CP |
| Monomer (ASTM D3312-74) | 30.9% |
| Acid Value | 16.3 |
| Peak Exotherm SPI | 177° C. |
| Gel | 11.3 minutes |
| Cure | 13.2 minutes |

| Molecular weight | (1) | (2) |
|---|---|---|
| NO AV MW | 1517 | 1596 |
| WT AV MW | 7918 | 8351 |
| Z AV MW | 26752 | 27992 |
| Dispersity | 5.219 | 5.232 |

The following example contains a tetracarboxylic acid—i.e., benzophenonetetra—carboxylic anhydride (BTDA):

EXAMPLE 6

| MATERIAL | WEIGHT | MOLES | EQUIVA-LENTS | % EQUIVA-LENTS |
|---|---|---|---|---|
| PART I | | | | |
| MA | 696 | 7.10 | 14.20 | 27.96 |
| BTDA | 596 | 1.85 | 7.40 | 14.57 |
| $H_2O$ | 195 | 10.83 | 10.83 | 21.32 |
| PART II | | | | |
| DCPD | 1392 | 10.58 | 10.58 | 20.83 |
| PART III | | | | |
| THEIC | 145 | 0.56 | 1.67 | 3.29 |
| 1,6 HD | 721 | 6.11 | 6.11 | 12.03 |
| PART IV | | | | |
| HQ | 1.0 | | | |
| PART V | | | | |
| PMS | 1438 | | | |

The ingredients are charged into a reactor equipped with a motor driven agitator carbon dioxide sparge tube and a condenser with packed column, reactor can be heated by electric mantle with temperature controller.

Set reactor for total reflux, load Part I. Heat to 200° F., after exotherm, start adding Part II. Keep temperature below 260° F. When all of Part II was added, heat to 260° F., and hold for one-half hour, change to packed column and add Part III. Heat to 335±15° F. and hold for an acid value of below 30 and a viscosity of T. When the anticipated constants were obtained, blow off reflux solvent, apply 24 inches vacuum. Cool to 250° F., remove vacuum, add Part IV, mix 15-20 minutes, add Part V, cool to below 100° F.

| PROPERTIES OF PRODUCT (EX. 6) | |
|---|---|
| Weight per Gallon | 9.17 |
| Monomer (ASTM D3312-74) | 32.4% |
| Viscosity - Brookfield | 11700 CP |
| Sunshine Gel Time + 1% tert-butyl perbenzoate (TBP) | 27.1 |
| Acid Value | 24.6 |
| Peak Exotherm SPI | 85° C. |

It is understood that other copolymerizable ethylenically unsaturated monomers both aromatic and aliphatic such as vinyl toluene, styrene, diallyl phthalate, methyl methacrylate, etc., can be used to obtain specific desired characteristics The resin could also be dissolved in a solvent such as toluol, methyl ethyl ketone (MEK), xylol or mixtures to obtain a "B" stage polymer system for molding purposes. The following is an example of a system of this type.

EXAMPLE 7

Using Example 4 the following "B" stage system was made and tested for film characteristics. It contained no vinyl monomer, i.e., Example 4 (without PMS).

| Hard Resin + Inhibitor - No PMS | 51 parts |
|---|---|
| MEK Solvent | 48 parts |
| Dicup Catalyst (Dicymyl peroxide) | 1 part |
| PROPERTIES OF PRODUCT (EX. 7) | |
| Weight per Gallon | 8.43 |
| Viscosity - Brookfield - Spindle 2 - RPM 60-25° C. | 93 |
| Non-volatile solids - 2 grams - 2 hours - 200° C. | 51% |

The resin of Example 4 was crushed into a powder, then weighed into a closed container along with the MEK solvent, the lid was put on tight and agitated until the resin of Example 4 was in solution, then 1% Dicymul peroxide was added and thoroughly mixed in to yield a resin-catalyst mixture.

A section of fiber glass material was dipped into the resin catalyst mixture, then drained and dried to make sure all of the solvent was eliminated. The "B" state fiber coated with dried resin was cut into sheets. The resulting sheets were stacked high, then cured in a press at 3.33 tons per (sq.) inch pressure and 300° F. for 4 minutes.

Multi layers of fiber glass coated with "B" stage material can be pressed into sheets or forms to obtain rigid sheet or composite.

The compositions of this invention were tested for thermal aging. Results are presented in the following table:

TABLE II

TWISTED COIL
International method in accordance with IEC Document 464
(Secretariat Document 16C Part 3 Sheet 2)

| BOND STRENGTH IN LBS. | INITIAL | | 100 HOURS | | 500 HOURS | | 1000 HOURS | |
|---|---|---|---|---|---|---|---|---|
| | R.T. | 220° C. | R.T. | 220° C. | R.T. | 220° C. | R.T. | 220° C. |
| Example 1 | 84.8 | 6.5 | 64.4 | 10.0 | 39.9 | 7.8 | 41.2 | 7.6 |
| Example 2 | 73.3 | 8.3 | 86.2 | 14.0 | 58.5 | 9.1 | 45.9 | 8.1 |
| Example 5 | 68.9 | 13.2 | 89.8 | 17.2 | 85.4 | 13.0 | 71.9 | 11.1 |

| ASTM D-3377 at 240° WEIGHT LOSS | 24 HRS. | 48 HRS. | 100 HRS. | 500 HRS. | 1000 HRS. |
|---|---|---|---|---|---|
| Example 1 | 15.2% | 20.4% | 25.4% | 27.2% | 34.9% |
| Example 2 | 4.4% | 5.0% | 6.1% | 11.4% | 13.7% |
| Example 5 | 3.0% | 3.3% | 4.2% | 7.9% | 9.8% |

The compositions of these inventions can withstand temperatures in excess of 200° C. for the normal life of a motor or transformer in which they are utilized. The selected cured products are highly resistant to oil, chemicals, and moisture.

In accelerated aging tests they retain their toughness, flexibility, excellent bonding strength and high dielectric properties after heat aging for as long as 20,000 hours at over 200° C. based on extrapolated values.

The compositions of this invention can be employed to prepare insulating coatings and in particular coatings yielding electrical conductor coatings have improved properties. These coatings are particularly valuable for impregnating armature and field coils of motors and for both power and distribution transformers of either the oil or dry type where long life at high operating maximum penetration is required. These coatings provide maximum penetration in the tightest wound coils. They are particularly suitable for impregnating motor stators, rotors and other electrical equipment and as potting compositions.

Other uses include the following: electronic insulation, adhesives for printed circuit boards, mica binders, in encapsulating, pultrusion, bulk moldings, flat sheets, wire enamels, radiation curing polymers, as potting resins, optic fiber coatins, etc.

In essence, they are useful where polyesters are currently used and where high temperature properties are desired.

Although the utility of the polyester resins of this invention has been described principally in terms of electrical applications, it should be understood that these resins may be used in all of the other applications suitable for synthetic resins. Thus, these resins can be employed in protective coating applications by applying the resin to a surface by brushing or spraying with subsequent curing. When used as a protective coating, selected resin compositions of this type have outstanding resistance to weathering. Selected resins can also be employed in varnish and paint formulations. These resins can also be used in molding powder formulations by mixing them with various fillers such as wood flour, diatomaceous earth, carbon, silica, etc. These resins are also useful as coatings for tapes, glass cloth, fabrics, paper, as mica binders, as electrical tubing and sleeving varnishes as a laminating varnish, and tooling resins to be used on molds for other resins. They are particularly useful as "B" stage resins.

We claim:

1. A dicyclopentadiene and tris(2-hydroxyethyl)isocyanurate modified unsaturated polyester.
2. The polyester of claim 1, blended with at least one polymerizable ethylenically unsaturated monomer.
3. The blend of claim 2 where the polymerizable ethylenically unsaturated monomer is a vinyl aromatic monomer.
4. A cured product of any of claims 1-3.
5. An electrical insulating coating containing a cured product of claim 4.
6. A sheet or film containing a cured product of of claim 1.
7. A sheet or film containing a cured product of any of claims 2, or 3.
8. A fiber reinforced sheet or film of claim 6.
9. A polyester of any of claims 1-3 where the dicyclopentadiene comprises from about 20-38 percent by weight of the polyester and tris(2-hydroxyethyl)isocyanurate comprises from about 1.5 to 30 percent by weight of the polyester.
10. A polyester of claims 2 or 3 where the ethylenically unsaturated monomer in the blend is from 20-60 percent by weight of the polyester.
11. A polyester of claim 1 produced by a process which comprises reacting a polyol composition containing tris(2-hydroxyethyl)isocyanurate with a mixture of dicyclopentadiene esterified with an unsaturated dibasic acid and unesterified said dibasic acid and/or anhydride.
12. A polyester of claim 11 wherein in said process dicyclopentadiene with or without added polyols is added to hydrolyzed maleic anhydride at a temperature below 130° C. and a polyol containing composition containing tris(2-hydroxyethyl)isocyanurate is added and reacted therewith.
13. A polyester of claim 12 wherein in said process said dicyclopentadiene is added to a hydrolyzed mixture of maleic anhydride and trimellitic anhydride.
14. A polyester of claim 13 wherein said polyol containing composition contains also one or more polycarboxylic acids.

* * * * *